(12) United States Patent
Jung et al.

(10) Patent No.: US 11,292,370 B2
(45) Date of Patent: Apr. 5, 2022

(54) REAR SEAT FOR VEHICLE (71) Applicants: Hyundai Motor Company, Seoul (KR); Kia Motors Corporation, Seoul (KR); Daechang Seat Co., LTD-Dongtan, Gyeonggi-do (KR)

(72) Inventors: Chan Ho Jung, Gyeonggi-do (KR); Hyun Kyu Moon, Gyeonggi-do (KR); Tae Hee Won, Gyeonggi-do (KR); Jung Sang You, Gyeonggi-do (KR); Hun Woong Song, Ulsan (KR); Seon Chae Na, Gyeonggi-do (KR); Myung Soo Lee, Ulsan (KR); In Chang Hwang, Ulsan (KR); Jeong Soo Kim, Busan (KR); Jun Kyu Park, Gyeonggi-do (KR)

(73) Assignees: Hyundai Motor Company, Seoul (KR); Kia Motors Corporation, Seoul (KR); Daechang Seat Co., LTD-Dongtan, Gyeonggi-do (KR)

( * ) Notice: Subject to any disclaimer, the term of this patent is extended or adjusted under 35 U.S.C. 154(b) by 0 days.

(21) Appl. No.: 16/896,730

(22) Filed: Jun. 9, 2020

(65) Prior Publication Data
US 2021/0070200 A1 Mar. 11, 2021

(30) Foreign Application Priority Data
Sep. 10, 2019 (KR) .......... 10-2019-0112315

(51) Int. Cl.
*B60N 2/20* (2006.01)
*B60N 2/22* (2006.01)
(Continued)

(52) U.S. Cl.
CPC ............. *B60N 2/20* (2013.01); *B60N 2/22* (2013.01); *A47C 1/032* (2013.01); *A47C 1/035* (2013.01);
(Continued)

(58) Field of Classification Search
CPC ........ B60N 2/085; B60N 2/163; B60N 2/168; B60N 2/167; B60N 2/08; B60N 2/146; B60N 2/1685; B60N 2/1892; B60N 2/3047; B60N 2/20; B60N 2/04; B60N 2/22; B60N 2/3002; B60N 2/507; B60N 2/12; B60N 2/506; B60N 2/045; B60N 2/1615; B60N 2/0232; A47C 1/032; A47C 1/035
See application file for complete search history.

(56) References Cited

U.S. PATENT DOCUMENTS

| | | | | |
|---|---|---|---|---|
| 3,198,576 A | * | 8/1965 | Rosmarin | A47C 1/032 297/342 |
| 4,226,473 A | * | 10/1980 | Johnson | A47C 1/032 297/316 |

(Continued)

FOREIGN PATENT DOCUMENTS

JP 2004-058928 A 2/2004

*Primary Examiner* — Syed A Islam
(74) *Attorney, Agent, or Firm* — Mintz Levin Cohn Ferris Glovsky and Popeo, P.C.; Peter F. Corless (57) ABSTRACT

A rear seat for a vehicle is provided, in which when the seat back is reclined. The angle of the seat cushion is adjusted by following the operation of the seat back to provide an optimal posture for fatigue reduction of a passenger. When the seat back is folded, the seat cushion is not operated.

15 Claims, 10 Drawing Sheets

(51) Int. Cl.
*B60N 2/30* (2006.01)
*B60N 2/02* (2006.01)
*B60N 2/90* (2018.01)
*A47C 1/035* (2006.01)
*A47C 1/032* (2006.01)

(52) U.S. Cl.
CPC ............ *B60N 2/305* (2013.01); *B60N 2/3065* (2013.01); *B60N 2002/0236* (2013.01); *B60N 2002/948* (2018.02); *B60N 2205/35* (2013.01)

(56) References Cited

U.S. PATENT DOCUMENTS

| | | | | |
|---|---|---|---|---|
| 4,627,656 | A * | 12/1986 | Gokimoto | B60N 2/10 296/65.09 |
| 6,409,263 | B1 * | 6/2002 | Seibold | B60N 2/20 297/216.13 |
| 2010/0060061 | A1 * | 3/2010 | Koga | B60N 2/1803 297/344.1 |
| 2010/0109404 | A1 * | 5/2010 | Yamagishi | B60N 2/3065 297/341 |
| 2013/0069405 | A1 * | 3/2013 | Schehl | B60N 2/1814 297/313 |

* cited by examiner

REAR SEAT FOR VEHICLE

CROSS REFERENCE TO RELATED APPLICATION

The present application claims priority to Korean Patent Application No. 10-2019-0112315, filed Sep. 10, 2019, the entire contents of which is incorporated herein for all purposes by this reference.

BACKGROUND

1. Field of the Invention

The present disclosure relates to a rear seat for a vehicle that provides a fatigue reduction posture to a driver by tilting a seat cushion together when reclining a seatback.

2. Description of the Prior Art

A seat within a vehicle enables a driver or a passenger to sit in a comfortable posture without feeling fatigue even in long-distance travel. The seat includes a seat cushion that supports the load of a passenger and slides forward and rearward on the floor in the interior of the vehicle, and a seatback rotatable at predetermined angles about the seat cushion and that supports the back of a passenger. The interior of a vehicle accommodates people with various body sizes, and various spaces may be required to carry objects. To satisfy these requirements, in the related art, a seatback is folded and the angle is freely adjusted.

In particular, the rear seat has to provide a posture that reduces fatigue to a passenger because it has to provide a comfortable posture unlike the driver seat. However, in the related art, since the position of the seat cushion is fixed, even through the angle of the seatback of a rear seat is adjusted, it is difficult to achieve an optimal posture that reduces fatigue of a passenger. Further, a rear seat is required to secure a loading space in cooperation with a luggage compartment, so it is preferable that the position of the seat cushion is fixed when the seatback is folded.

The description provided above as a related art of the present disclosure is merely for helping understanding the background of the present disclosure and should not be construed as being included in the related art known by those skilled in the art.

SUMMARY

The present disclosure provides a rear seat for a vehicle that provides an optimal posture for reducing fatigue of a passenger since the angle of a seat cushion may be adjusted together when a seatback is reclined, and in which the seat cushion is not operated when the seatback is folded.

In view of the foregoing, a rear seat for a vehicle according to the present disclosure may include: a back frame rotatably connected to a seat bracket through a recliner; and a cushion frame rotatably mounted on the seat bracket and being rotated forward by the back frame when the back frame is tilted rearward by following the tilting of the back frame. Driving bars that extend downward and rotate with the back frame may be disposed at a lower end of the back frame, and connecting bars that extend upward and correspond to the driving bars may be disposed at a rear end of the cushion frame. Thus, when the back frame is tilted rearward, the connecting bars may be pushed by the rotating driving bars and the cushion frame may be rotated forward.

The driving bars may be disposed behind the connecting bars, connecting grooves recessed rearward may be formed at the front end of the driving bars, and connecting pins inserted in the connecting grooves may be formed at the connecting bars. The rear seat may further include: first rotary links rotatably connected to a rear end of the cushion frame and a rear end of the seat bracket; and second rotary links rotatably connected to a front end of the cushion frame and a front end of the seat bracket.

The first rotary links may be shorter than the second rotary links. Additionally, the first rotary links and the second rotary links are in a laid-down state at an initial position, and as the first and second rotary links are rotated forward to be erected, the cushion frame may be moved forward and upward. The rear seat may further include: a locking rod that extends in a front-rear direction from the seat bracket; a locking slider that is slidably disposed on the locking rod and of which a position is selectively fixed on the locking rod; and a connection link that is rotatably connected to the locking slider and the cushion frame and fixes a position of the cushion frame in cooperation with the locking slider.

The locking slider may include: a locking housing formed to surround the locking rod; and an elastic locking member disposed inside the locking housing, formed to surround the locking rod, elastically deformable in the width direction, fixing the position thereof by surrounding and tightening the locking rod, may be connected with an operation cable such that the elastic locking member deforms and extends in a width direction and separates from the locking rod when a pulling force is applied through the operation cable.

The elastic locking member may be a coil spring having a first end connected to the locking housing and a second end connected to the operation cable, and having the locking rod therethrough. The connection link may be a multi-link including several links rotatably connected to each other and may be connected to the locking slider and a front end of the cushion frame. The rear seat may include elastic return members connected to the seat bracket and the cushion frame and providing elasticity to rotate the cushion frame rearward.

The elastic return members may be spiral springs having a first end connected to the seat bracket and a second end connected to the second rotary link, and provide elasticity to rotate the second rotary links rearward. Stoppers that restrict behavior of the cushion frame by coming in contact with a rear end of the cushion frame when the cushion frame is at an initial position without rotating may be formed at a rear end of the seat bracket. The second rotary link may be a multi-link composed of several links rotatably connected to each other and may be an entire length greater than the first rotary link.

The rear seat may further include an actuator connected to the front end of the cushion frame and the seat bracket and may change a front-rear directional length thereof when operating to lift the front end of the cushion frame. The actuator may include: a motor disposed at the front end of the cushion frame and may be configured to apply torque when operating; and a screw that extends rearward from the motor, is rotatably connected to the seat bracket, and changes in length when the motor is operated.

According to the rear seat for a vehicle that has the structure described above, when the seat back is reclined, the angle of the seat cushion may be adjusted by following the operation of the seat back, thereby providing an optimal posture for fatigue reduction of a passenger. Further, when the seat back is folded, the seat cushion is not operated, so cooperation with a luggage room is easy.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

A rear seat for a vehicle according to exemplary embodiments of the present disclosure is described hereafter with reference to the accompanying drawings.

Figure 1:
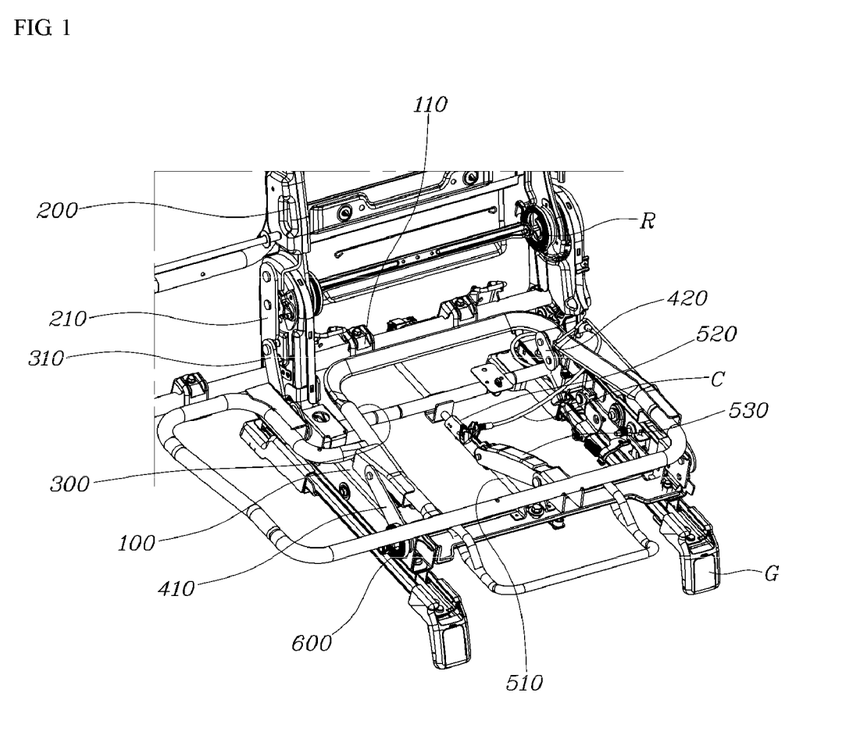
FIG. 1 is a view showing a rear seat for a vehicle according to an exemplary embodiment of the present disclosure.

A rear seat for a vehicle according to the present disclosure, as shown in FIG. 1, may include: a back frame 200 rotatably connected to a seat bracket 100 through a recliner R; and a cushion frame 300 rotatably mounted on the seat bracket 100 and being rotated forward by the back frame 200 when the back frame 200 is tilted rearward by following the tilting of the back frame 200. As described above, according to the present disclosure, the back frame 200 may be connected to the seat bracket 100 via the recliner R to be rotatable forward/rearward, and the cushion frame 300 may be mounted on the seat bracket 100 to rotate forward/rearward, to move vertically when rotating forward/rearward. The seat bracket 100 may move along guide rails G to move the seat forward/rearward.

In particular, the cushion frame 300 may be configured to operate by following tilting of the back frame 200. In other words, when the back frame 200 is tilted rearward, the cushion frame 300 may be rotated forward by the back frame 200 causing the passenger sitting in the seat to lie back on the seat, thereby reducing fatigue. The present disclosure is described in detail hereafter.

Figure 2:
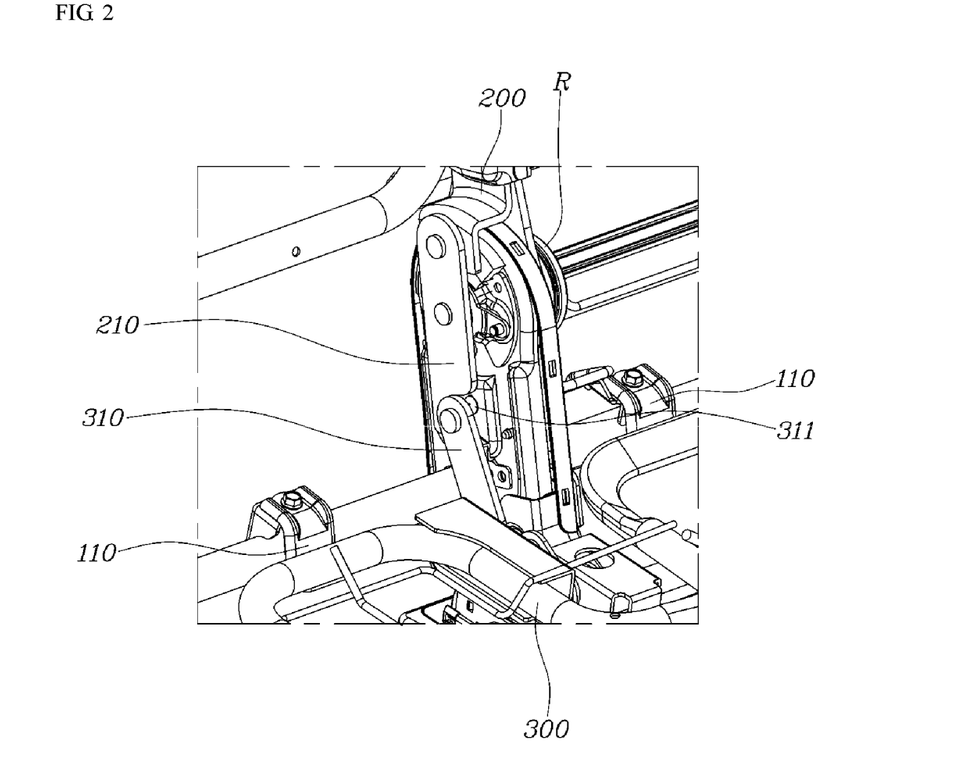
FIGS. 2 and 3 are views showing a following operation structure of a driving bar and a connecting bar of the rear seat for a vehicle shown in FIG. 1 according to an exemplary embodiment of the present disclosure.
Figure 3:
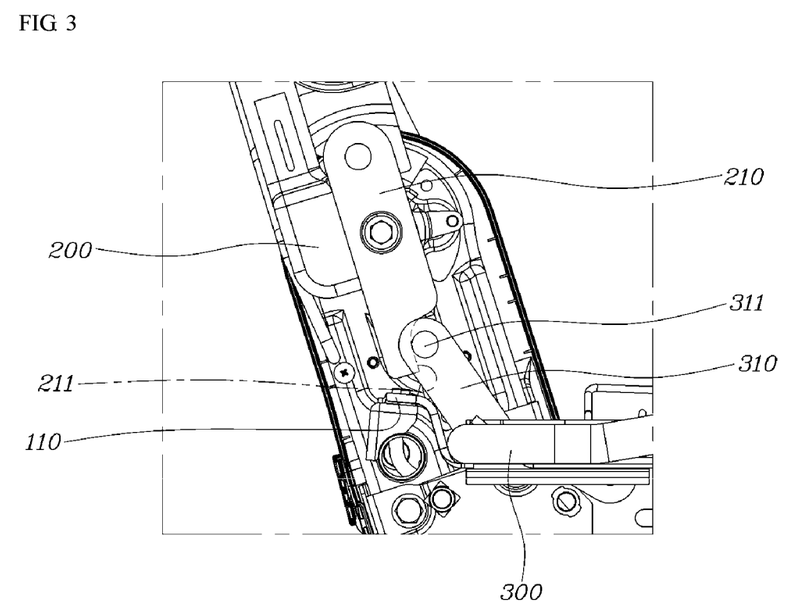

As shown in FIGS. 2 and 3, driving bars 210 that extend downward and rotate with the back frame 200 may be disposed at the lower end of the back frame 200, and connecting bars 310 extending upward and corresponding to the driving bars 210 may be disposed at the rear end of the cushion frame 300. Accordingly, when the back frame 200 is tilted rearward, the connecting bars 310 may be pushed by the rotating driving bars 210, to allow the cushion frame 300 to be rotated forward.

The driving bars 210 may be integrally coupled to the lower end of the back frame 200, so they have the same rotational path as the back frame 200. Further, the connecting bars 310 may be integrally coupled to the rear end of the cushion frame 300, so they have the same rotational path as the cushion frame 300. Therefore, when the back frame 200 is rotated, the driving bars 210 push the connecting bars 310, so the cushion frame 300 may be rotated by following the operation of the back frame 200. In particular, as shown in FIG. 3, the driving bars 210 may be disposed behind the connecting bars 310, connecting grooves 211 recessed rearward may be formed at the front end of the driving bars 210, and connecting pins 311 inserted in the connecting grooves 211 may be formed at the connecting bars 310.

Since the driving bars 210 may be disposed behind the connecting bars 310, as described above, when the back frame 200 is tilted rearward, the lower end thereof may be rotated forward, the connecting bars 310 may be pushed forward, and thus, the cushion frame 300 may be moved forward. Further, when the back frame 200 is rotated and folded forward, the driving bars 210 may be rotated rearward away from the connecting bars 310, and thus, the position of the cushion frame 300 may be maintained. Accordingly, even though the back frame 200 is folded toward the cushion frame 300, the position of the cushion frame 300 is not changed, so cooperation with the luggage board in a luggage room is easy.

Figure 4:
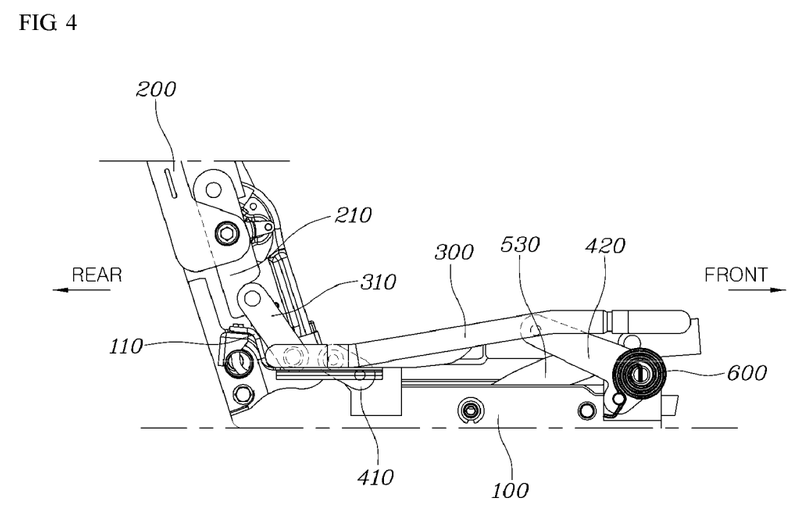
FIGS. 4 and 5 are views illustrating the operation state of the rear seat for a vehicle shown in FIG. 1 according to an exemplary embodiment of the present disclosure.
Figure 5:
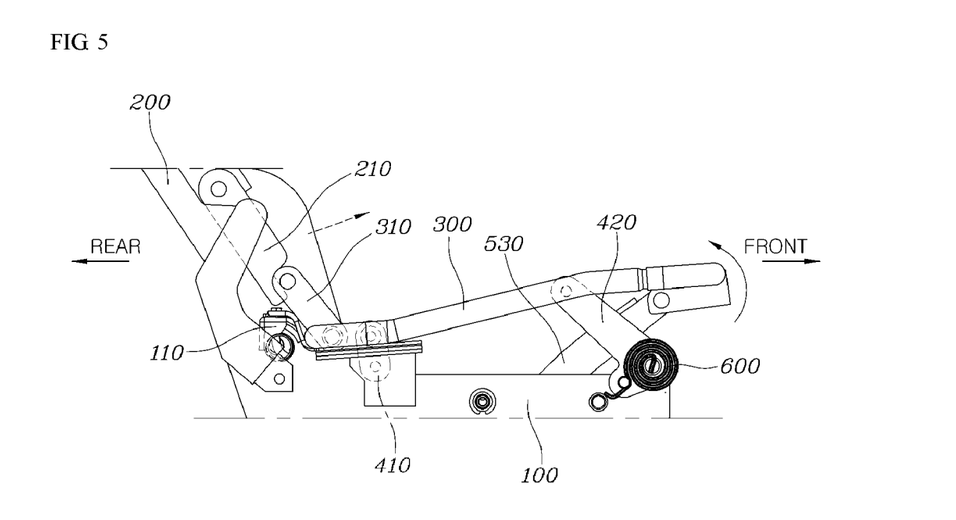

Since the connecting pins 311 of the connecting bars 310 may be inserted in the connecting grooves 211 of the driving bars 210, the contact state between the driving bars 210 and the connecting bars 310 may be maintained, and thus, cooperation between the driving bars 210 and the connecting bars 310 may be stably performed. On the other hand, as shown in FIGS. 1, 4, and 5, the rear seat may further include: first rotary links 410 rotatably connected to the rear end of the cushion frame 300 and the rear end of the seat bracket 100; and second rotary links 420 rotatably connected to the front end of the cushion frame 300 and the front end of the seat bracket 100. In this configuration, the links may be rotatably connected by hinge structures to be rotatably assembled.

The first rotary links 410 and the second rotary links 420 may be implemented in various ways. As an exemplary embodiment, the first rotary link 410 may be formed in a straight bar shape of which a first end is rotatably connected to the rear end of the cushion frame 300 and a second end is rotatably connected to the rear end of the seat bracket 100. The second rotary link 420 may be formed in a straight bar shape of which a first end is rotatably connected to the front end of the cushion frame 300 and a second end is rotatably connected to rear end of the seat bracket 100.

The first rotary links 410 and the second rotary links 420 are in a laid-down state at the initial position, and as they are rotated forward to be erected, the cushion frame 300 may be rotated and moved forward, thereby being lifted. As described above, the cushion frame 300 and the seat bracket 100 may be rotatably connected through the first rotary links 410 and the second rotary links 420, and thus, the cushion frame 300 may be supported by the seat bracket 100 and may be rotated to be lifted forward on the seat bracket 100 by rotation of the first rotary links 410 and the second rotary links 420.

The first rotary links 410 may be formed shorter than the second rotary links 420, and thus, the front end of the cushion frame 300 may be lifted higher than the rear end thereof when the cushion frame 300 is rotated. Accordingly, since the front end of the cushion frame 300 is lifted higher than the rear end when the back frame 200 is tilted rearward and the cushion frame 300 is simultaneously rotated, the portion corresponding to the knee joints of a passenger may be lifted, and thus, it may be possible to provide a comfortable sitting feeling to the passenger.

Figure 6:
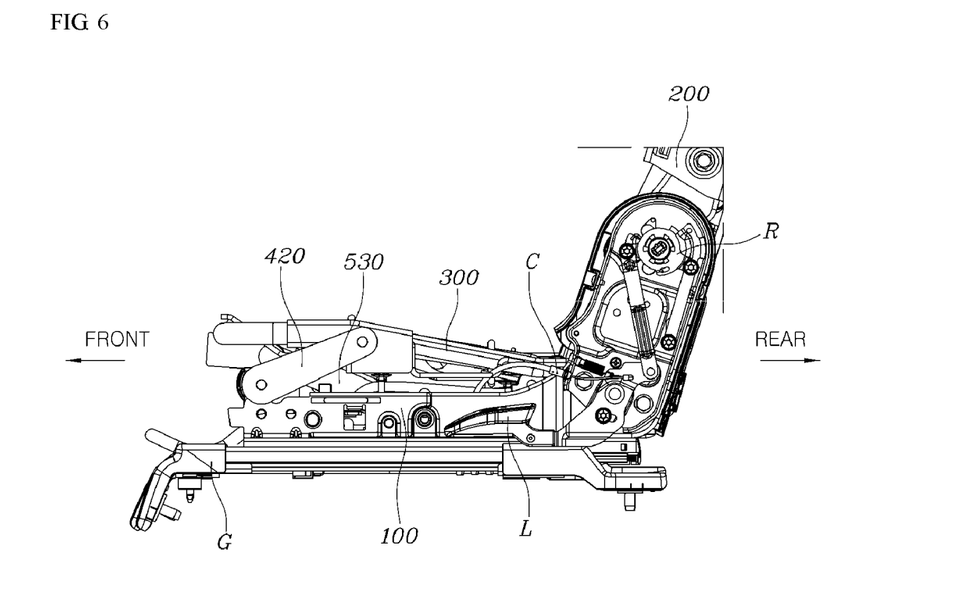
FIGS. 6 to 8 are views illustrating the rear seat for a vehicle shown in FIG. 1 according to an exemplary embodiment of the present disclosure.
Figure 7:
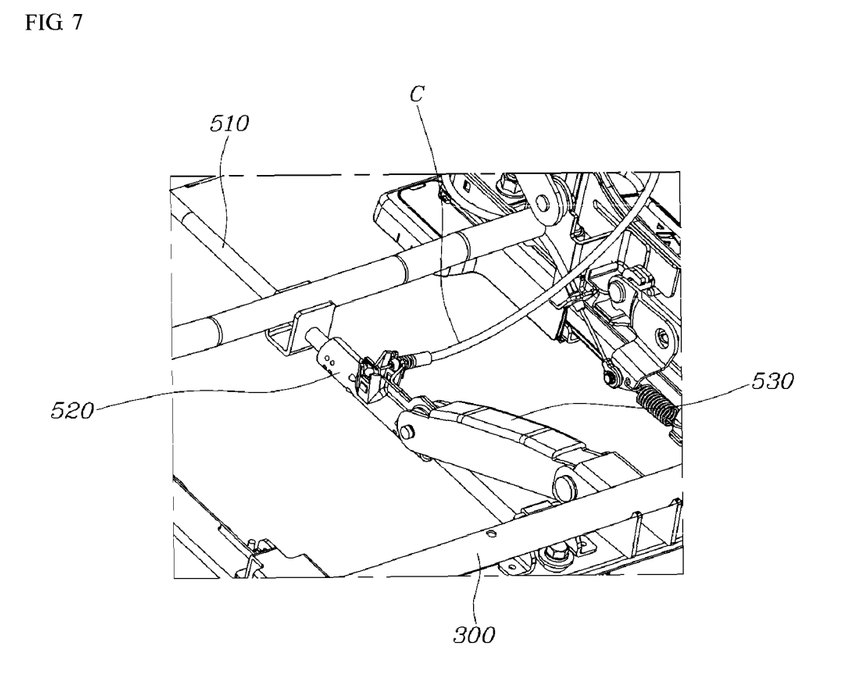

The cushion frame 300 to which the first rotary links 410 and the second rotary links 420 according to this exemplary embodiment are applied may require a fixing mechanism for fixing the position of the cushion frame 300. Accordingly, a fixing mechanism, as shown in FIGS. 6 and 7, may further include: a locking rod 510 that extends in a front-rear direction from the seat bracket 100; a locking slider 520 that is slidably disposed on the locking rod 510 and of which the position is selectively fixed on the locking rod 510; and a connection link 530 that is rotatably connected to the locking slider 520 and the cushion frame 300 and fixes the position of the cushion frame 300 in cooperation with the locking slider 520.

The locking rod 510 may be formed in a straight or linear rod shape to connect the front end and the rear end of the seat bracket 100 and may be installed through a separate bracket B disposed on the seat bracket 100. The locking slider 520 may be movably disposed on the locking rod 510. The locking slider 520 may be rotatably connected to the cushion frame 300 via the connection link 530, and when the position of the locking slider 520 is fixed on the locking rod 510, rotational movement of the cushion frame 300 is limited, thereby fixing the position of the cushion frame 300.

The connection link 530 connected to the locking slider 520 and the front end of the cushion frame 300 may be a multi-link including several links rotatably connected to each other, whereby the locking slider 520 may smoothly move with rotational movement of the cushion frame 300. As described above, the fixing mechanism including the locking rod 510, the locking slider 520, and the connection link 530 may be provided to fix the rotational position of the seat frame.

Figure 8:
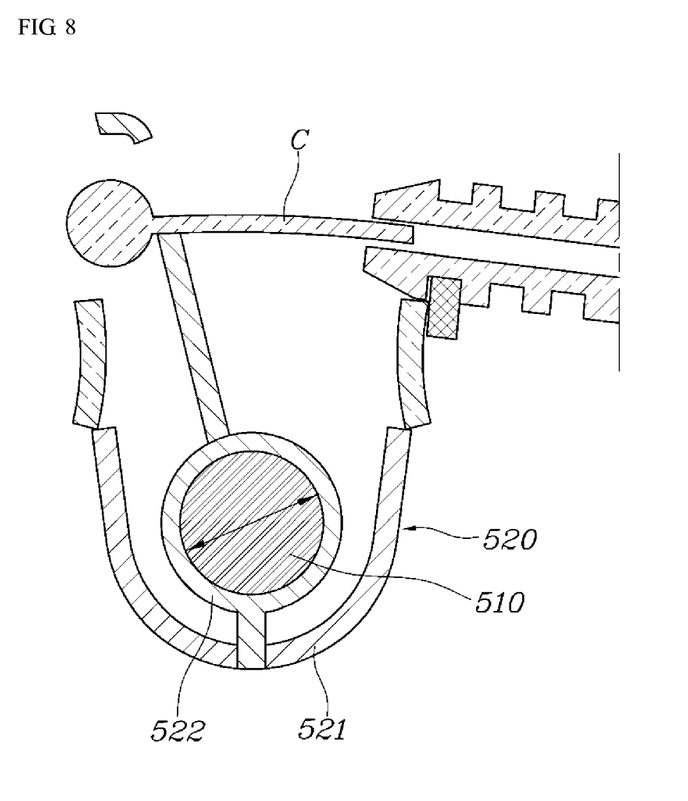

In particular, as shown in FIG. 8, the locking slider 520 may include: a locking housing 521 formed to surround the locking rod 510; and an elastic locking member 522 disposed inside the locking housing 521, formed to surround the locking rod 510, elastically deformable in the width direction, fixes the position thereof by surrounding and tightening the locking rod 510, connected with an operation cable C such that the elastic locking member 522 deforms and extends in the width direction and separates from the locking rod 510 when a pulling force is applied through the operation cable C.

The locking housing 521 may include an internal space for surrounding the locking rod 510 and the elastic locking member 522 moves together with the locking housing 521 inside the locking housing 521 and fixes the position thereof by surrounding and tightening the locking rod 510 or separates from the locking rod 510 by elastically deforming. The operation cable C may be connected for selective deformation of the elastic locking member 522 and may be connected to operate with the recliner R. In other words, as shown in FIG. 6, when a separate lever L is operated, the recliner R may be unlocked and a pulling force acts in the operation cable C.

The elastic locking member 522 that is elastically deformed in the width direction by the operation cable C may be a coil spring and has a first end connected to the locking housing 521 and a second end connected to the operation cable C, whereby the length in the width direction may be changed, based on whether a pulling force of the operation cable C is applied. In other words, the elastic locking member 522 elastically deforms to contract and tightens the locking rod 510 when a pulling force is not applied through the cable, the position thereof on the locking rod 510 is fixed. When a pulling force is applied through the cable, the elastic locking member elastically deforms and extends in the width direction and separates from the locking rod 510, whereby it may move. Accordingly, the locking slider 520 may be selectively moved on the locking rod 510 and then the position thereof may be fixed, thereby being able to fix the position of the cushion frame 300 connected with the locking slider 520 through the connection link 530.

As shown in FIG. 4, the rear seat may further include an elastic return member 600 connected between the seat bracket 100 and the cushion frame 300 and provides elasticity to rotate the cushion frame 300 rearward. The elastic return member 600 may restore the cushion frame to the initial position and provide elasticity while being connected to the seat bracket 100 and the cushion frame 300 such that the cushion frame 300 moves rearward.

In particular, the elastic return member 600 may be a spiral spring having a first end connected to the seat bracket 100 and a second end connected to the second rotary link 420, and may provide elasticity to rotate the second rotary link 420 rearward. As described above, the elastic return member 600 may be a spiral spring and provide elasticity in a state in which it is connected to the seat bracket 100 and the second rotary link 420 such that the second rotary link 420 are rotated rearward, thereby retuning the cushion frame 300 to the initial position. A plurality of elastic return members 600 may be provided and may be applied to not only a pair of second rotary links 420, but also to other positions to apply a return force to the cushion frame 300.

Further, as shown in FIG. 3, stoppers 110 that restrict behavior of the cushion frame 300 by coming in contact with the rear end of the cushion frame 300 when the cushion frame 300 is at the initial position without rotating may be formed at the rear end of the seat bracket 100. Since the stoppers 110 may be formed at the rear end of the seat bracket 100, the cushion frame 300 may be maintained at the accurate initial position and may be prevented from excessively moving rearward when rotating and returning to the initial position. The stoppers 110 may be bent to surround a portion of the rear end of the cushion frame 300 to stably seat the rear end of the cushion frame 300.

Figure 9:
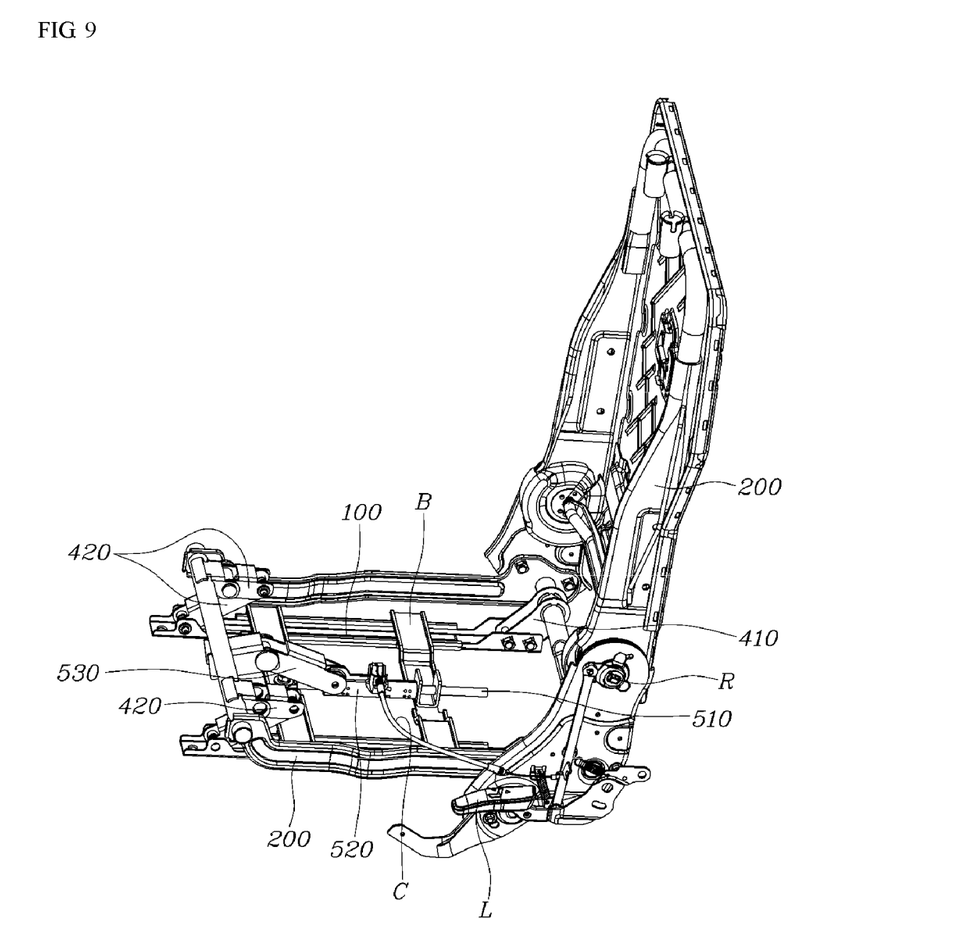
FIGS. 9 to 11 are views showing a rear seat for a vehicle according to an exemplary embodiment of the present disclosure.

As another exemplary embodiment of the rotary links, as shown in FIG. 9, the second rotary link 420 may be a multi-link composed of several links rotatably connected to each other and may have an entire length greater than the first rotary link 410. Since the second rotary link 420 may be a multi-link, the length may be changed when it is folded or unfolded while rotating. Further, since the second rotary link 420 is greater than the first rotary link 410, the front of the cushion frame 300 may be lifted higher than the rear end when the cushion frame 300 rotates.

Figure 10:
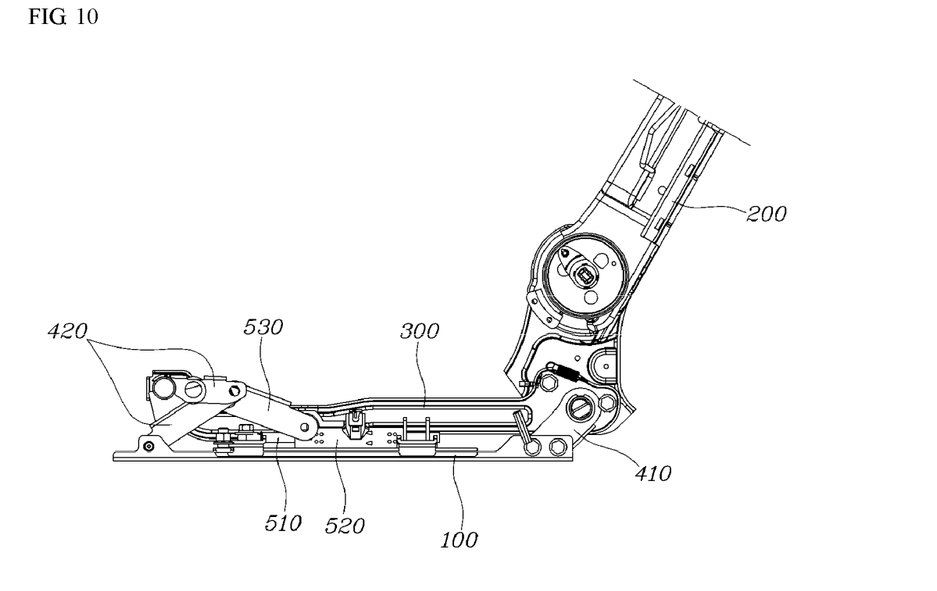
Figure 11:
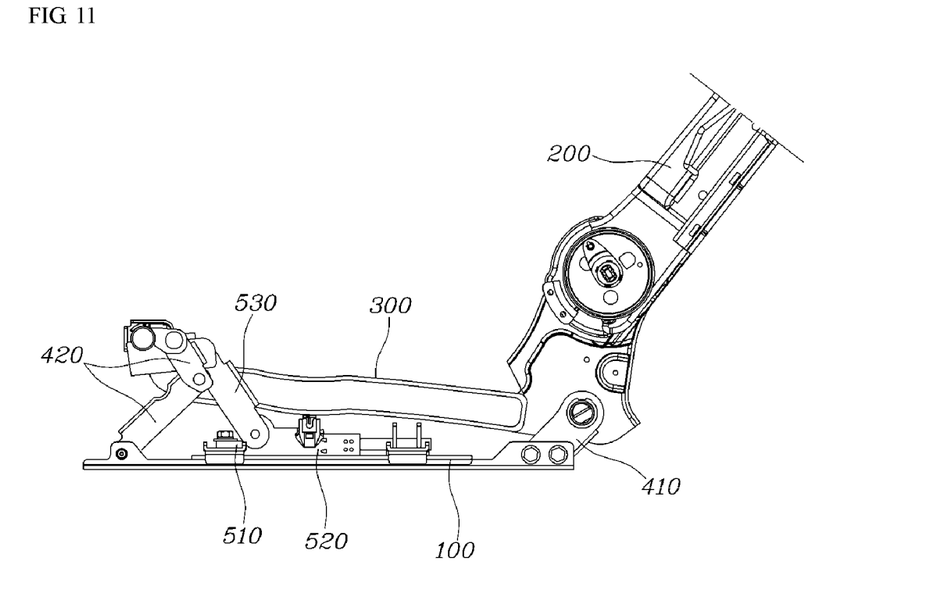

Further, the operation of lifting the front end of the cushion frame 300 may be performed separately, it may be possible to provide various postures that passenger require. When the cushion link 300 is at the initial position with the second rotary links 420 folded, as shown in FIG. 10, and when a passenger unlocks the fixing mechanism by operating a lever and then lifts only the front end of the cushion frame 300, as shown in FIG. 11, the first rotary links 410 maintain the non-rotated state and the second rotary links 420 may be unfolded, whereby only the front end of the cushion frame 300 may be lifted.

Accordingly, it may be possible to achieve a relaxation mode in which only the front end of the cushion frame 300 is lifted and an additional relaxation mode in which the back frame 200 is tilted and the entire cushion frame 300 is lifted. The example described above may be a manual operation mode in which a passenger operates the lever L.

Figure 12:
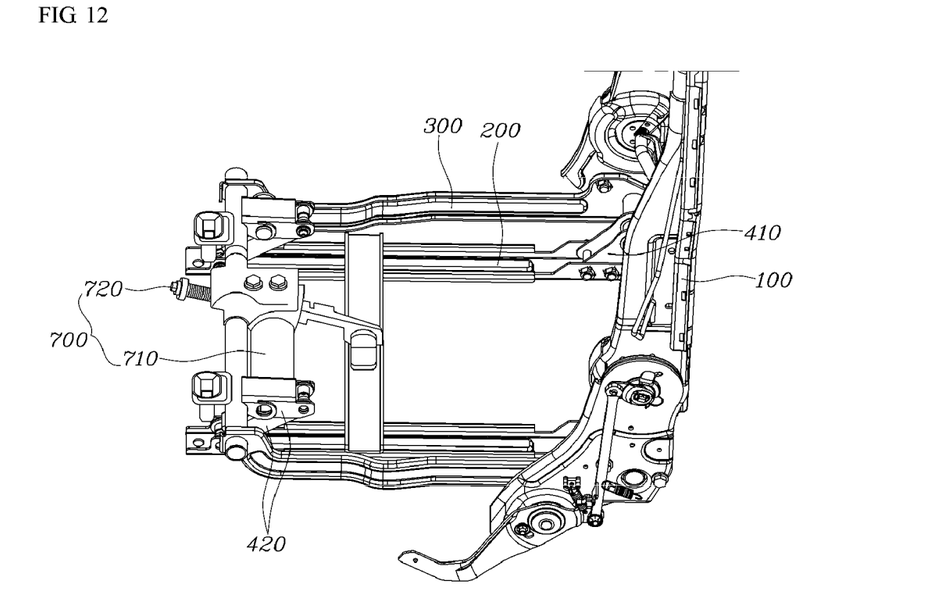
FIGS. 12 to 14 are views showing the rear seat for a vehicle according to an exemplary embodiment of the present disclosure.

As shown in FIG. 12, the rear seat may further include an actuator 700 connected to the front end of the cushion frame 300 and the seat bracket 100 and changes the front-rear directional length thereof when operating to lift the front end of the cushion frame 300. The actuator 700 may be operated by a passenger operating a switch, and may increase the length when operating such that the cushion frame 300 is rotated on the seat bracket 100. This may correspond to an automatic operation mode for automating the posture mode of the seat.

In particular, the actuator 700 may include: a motor 710 disposed at the front end of the cushion frame 300 and may be configured to apply torque when operating; and a screw 720 that extends rearward from the motor 710, may be rotatably connected to the seat bracket 100, and changes in length when the motor is operated. The motor 710 may be a motor configured to rotate forward/backward and the screw may increase in length by rotating when the motor is operated. Since the screw extends rearward from the motor 710 disposed at the front end of the cushion frame 300 and is rotatably connected to the seat bracket 100, when the length is increased, the screw may push the front end of the cushion frame 300 in cooperation with the motor, to lift the cushion frame 300 by the second rotary links 420.

Figure 13:
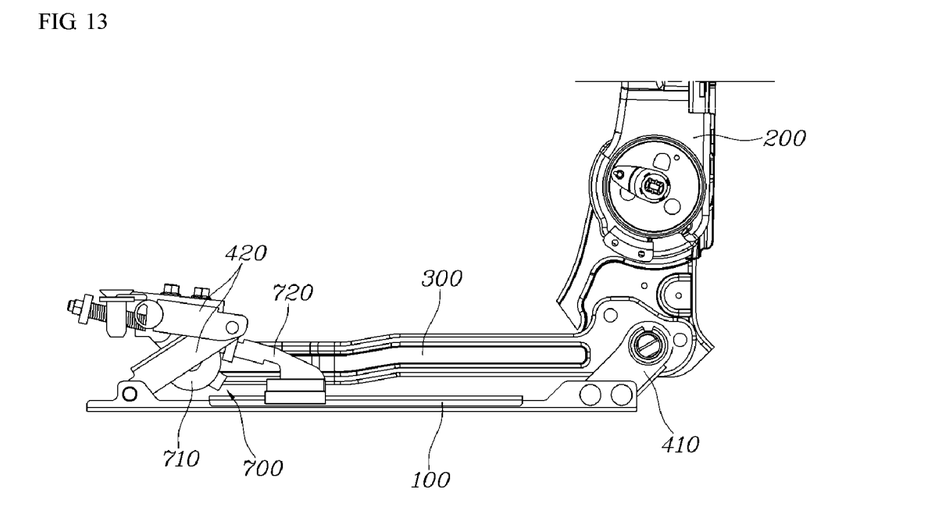
Figure 14:
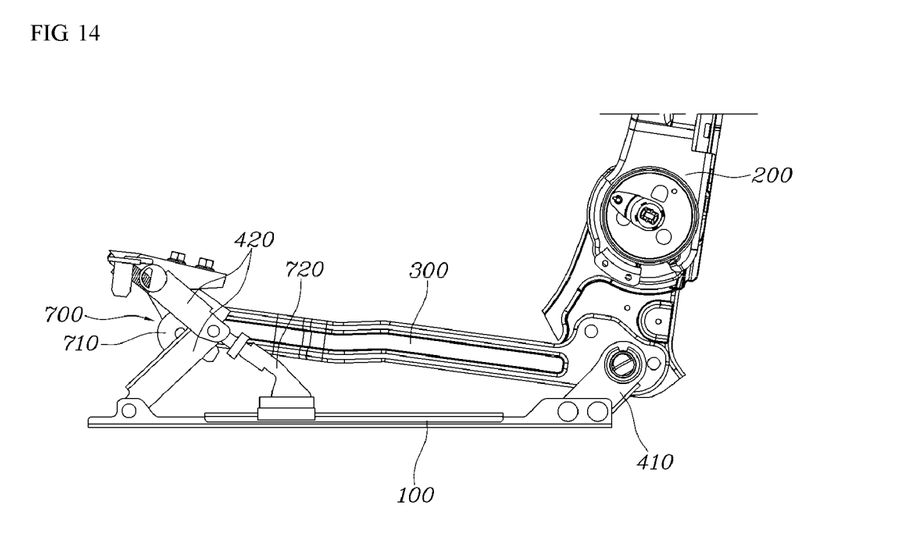

Accordingly, when the cushion frame 300 is at the initial position with the second frames 420 folded, as shown in FIG. 13, and when a passenger starts the motor 710 by operating a switch, as shown in FIG. 14, the length of the screw 720 increases, and thus, the first rotary links 410 may maintain the non-rotated state, the second links 420 may be unfolded, and the front end of the cushion frame 300 may be lifted. Accordingly, it may be possible to achieve a relaxation mode in which the front end of the cushion frame 300 is lifted and an additional relaxation mode in which the back frame 200 is tilted and the entire cushion frame 300 is lifted.

According to the rear seat for a vehicle that has the structure described above, when the seat back is reclined, the angle of the seat cushion may be adjusted by following the operation of the seat back, thereby providing an optimal posture for fatigue reduction of a passenger. Further, when the seat back is folded, the seat cushion is not operated, so cooperation with a luggage room is easy.

Although the present disclosure was provided above in relation to specific embodiments shown in the drawings, it is apparent to those skilled in the art that the present disclosure may be changed and modified in various ways without departing from the scope of the present disclosure, which is described in the following claims.

What is claimed is:
1. A rear seat for a vehicle, comprising:
a back frame rotatably connected to a seat bracket through a recliner;
a cushion frame rotatably mounted on the seat bracket and being rotated forward by the back frame when the back frame is tilted rearward by following the tilting of the back frame;
a locking rod that extends in a front-rear direction from the seat bracket;
a locking slider that is slidably disposed on the locking rod and of which a position is selectively fixed on the locking rod; and
a connection link that is rotatably connected to the locking slider and the cushion frame and fixes a position of the cushion frame in cooperation with the locking slider.
2. The rear seat of claim 1, further comprising:
driving bars that extend downward and rotate with the back frame, wherein the driving bars are disposed at a lower end of the back frame; and
connecting bars that extend upward and corresponding to the driving bars, wherein the connecting bars are disposed at a rear end of the cushion frame,
wherein when the back frame is tilted rearward, the connecting bars are pushed by the rotating driving bars and the cushion frame is rotated forward.
3. The rear seat of claim 2, wherein the driving bars are disposed behind the connecting bars, connecting grooves recessed rearward are formed at a front end of the driving bars, and connecting pins inserted in the connecting grooves are formed at the connecting bars.
4. The rear seat of claim 1, further comprising:
first rotary links rotatably connected to a rear end of the cushion frame and a rear end of the seat bracket; and
second rotary links rotatably connected to a front end of the cushion frame and a front end of the seat bracket.
5. The rear seat of claim 4, wherein the first rotary links are shorter than the second rotary links.
6. The rear seat of claim 4, wherein the first rotary links and the second rotary links are in a laid-down state at an initial position, and as the first and second rotary links are rotated forward to be erected, the cushion frame is moved forward and upward.
7. The rear seat of claim 1, wherein the locking slider includes:
a locking housing formed to surround the locking rod; and an elastic locking member disposed inside the locking housing, formed to surround the locking rod, elastically deformable in the width direction, fixing the position thereof by surrounding and tightening the locking rod, connected with an operation cable to cause the elastic locking member to deform and extend in a width direction and separate from the locking rod when a pulling force is applied through the operation cable.

8. The rear seat of claim 7, wherein the elastic locking member is a coil spring having a first end connected to the locking housing and a second end connected to the operation cable, and having the locking rod therethrough.

9. The rear seat of claim 1, wherein the connection link is a multi-link including a plurality of links rotatably connected to each other and connected to the locking slider and a front end of the cushion frame.

10. The rear seat of claim 4, further comprising:
elastic return members connected to the seat bracket and the cushion frame and providing elasticity to rotate the cushion frame rearward.

11. The rear seat of claim 10, wherein the elastic return members are spiral springs having a first end connected to the seat bracket and a second end connected to the second rotary link, and provide elasticity to rotate the second rotary links rearward.

12. The rear seat of claim 1, wherein stoppers that restrict behavior of the cushion frame by coming in contact with a rear end of the cushion frame when the cushion frame is at an initial position without rotating are formed at a rear end of the seat bracket.

13. The rear seat of claim 4, wherein the second rotary link is a multi-link including several links rotatably connected to each other and has an entire length greater than the first rotary link.

14. The rear seat of claim 4, further comprising:
an actuator connected to the front end of the cushion frame and the seat bracket and changes a front-rear directional length thereof when operating to lift the front end of the cushion frame.

15. The rear seat of claim 13, wherein the actuator includes:
a motor disposed at the front end of the cushion frame and configured to apply torque when operating; and
a screw that extends rearward from the motor, is rotatably connected to the seat bracket, and changes in length when the motor is operated.

* * * * *